United States Patent
Gotoh et al.

(10) Patent No.: US 7,853,873 B2
(45) Date of Patent: Dec. 14, 2010

(54) DATA PROCESSING APPARATUS, DATA PROCESSING METHOD, AND COMPUTER PROGRAM FOR GENERATING ELECTRONIC DATA FROM A PAPER DOCUMENT

(75) Inventors: Taeko Gotoh, Kawasaki (JP);
Tomotoshi Kanatsu, Meguro-ku (JP);
Kitahiro Kaneda, Yokohama (JP); Jun Fujisawa, Setagaya-ku (JP); Satoshi Imaizumi, Itabashi-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1027 days.

(21) Appl. No.: 11/433,034

(22) Filed: May 12, 2006

(65) Prior Publication Data

US 2007/0003139 A1 Jan. 4, 2007

(30) Foreign Application Priority Data

Jun. 30, 2005 (JP) .............................. 2005-191539

(51) Int. Cl.
*G06F 17/00* (2006.01)
(52) U.S. Cl. .................. 715/246; 715/243; 715/252; 715/247; 715/253
(58) Field of Classification Search .............. 715/252, 715/246, 243, 253, 247
See application file for complete search history.

(56) References Cited

U.S. PATENT DOCUMENTS

| 5,680,478 | A | 10/1997 | Wang |
| 6,720,965 | B1 | 4/2004 | Hirosawa |
| 2002/0175928 | A1* | 11/2002 | Kanbayashi ................. 345/700 |
| 2005/0141777 | A1 | 6/2005 | Kuwata et al. |

FOREIGN PATENT DOCUMENTS

| JP | 2000-163044 A | 6/2000 |
| JP | 2002-073598 A | 3/2002 |
| JP | 2002-165079 A | 6/2002 |
| JP | 2005-108194 A | 4/2005 |

* cited by examiner

*Primary Examiner*—Adam M Queler
(74) *Attorney, Agent, or Firm*—Canon U.S.A., Inc. I.P. Division

(57) ABSTRACT

A data processing apparatus produces electronic data from a document image in which a text part, a photograph part, etc. are mixed. This electronic data enables a user to display information in a required part. The apparatus extracts an object from an input image and integrates information on the extracted object and layout control information (script) for modifying a layout so as to generate integrated electronic data. A script program can be executed when the electronic data is used, which allows an object designated by a user to be magnified and rearranged so as to facilitate visualization of the object.

14 Claims, 13 Drawing Sheets

DATA PROCESSING APPARATUS, DATA PROCESSING METHOD, AND COMPUTER PROGRAM FOR GENERATING ELECTRONIC DATA FROM A PAPER DOCUMENT

BACKGROUND OF THE INVENTION

Field of the Invention

The present invention relates to a data processing apparatus, a data processing method, and a computer program for generating electronic data from a paper document.

In recent years, there have been an increasing number of occasions where a paper document is scanned, converted into electronic data, and browsed on a computer screen, with a view to saving office space or promotion of a paperless office due to environmental concerns.

When a user selects information from the electronic data and desires to enlarge and view the selected information on a screen, the user may use an editing tool installed in a personal computer. However, since such an editing tool simply enlarges part of an electronic document, a text sentence may extend beyond the screen boundary and not be visible to the user, thus causing users difficulty in grasping the context.

A technique is disclosed in Japanese Patent Laid-Open No. 2000-163044 for scanning a document and extracting characters in units of lines and performing processing, such as combination, enlargement, or reduction, on the extracted characters on a line by line basis, so as to facilitate ease of viewing.

Japanese Patent Laid-Open No. 2002-165079 discloses another technique in which a scanned document is divided into regions each of which has a classification attribute such as text, diagram, and picture. Each of the divided regions is magnified in accordance with a mode selected from a text priority mode, a diagram priority mode, and a picture priority mode, then laid out and printed out.

Further, a technique is described in Japanese Patent Laid-Open No. 2002-073598 in which a paper document is converted into an electronic document, and content information (object information) is generated from the electronic document. Then, the content information is registered and managed. In a document processor for processing an electronic document according to this technique, an electronic document preparation part analyzes a layout of image data and divides the image data into regions of predetermined attributes. Then, each of the contents of the individual regions is registered. The registered contents can be fetched and reused by selecting a required content from the registered contents listed on a display.

The foregoing techniques have the following disadvantages. An image data editing tool may simply enlarge an image to the extent that part of a text sentence goes beyond the screen boundary, causing users difficulty in grasping the meaning of the sentence. In order to obtain a required image, a more complicated operation may be necessary. In addition, such an editing tool is too expensive to be installed in a large number of computers.

In the technique according to Japanese Patent Laid-Open No. 2000-163044, enlargement/reduction processing is performed on a text region of a raster image, which may deteriorate the quality of a required image.

The technique according to Japanese Patent Laid-Open No. 2002-165079 allows enlargement processing only in units of attributes such as text and photograph. For example, in document data containing a plurality of photographs, enlarging only one of the photographs is not allowed. Moreover, variable magnification and layout are performed on an original image before the image is output, which causes difficulty in correlating the output image with the original document. In addition, this technique assumes that an image is to be printed out, thus resulting in low reusability.

In the technique according to Japanese Patent Laid-Open No. 2002-073598, in order to obtain a required document, a user causes a list of contents to be displayed and selects an intended content to be laid out. This brings about low operability.

SUMMARY OF THE INVENTION

In view of the foregoing disadvantages, for example, a data processing apparatus according to an aspect of the present invention includes: object extracting means for extracting an object from an input image; integrating means for integrating object information corresponding to the extracted object and layout control information for modifying a layout of the object, so as to generate integrated electronic data; and outputting means for outputting the integrated electronic data.

According to an aspect of the present invention, an original paper document is converted into an electronic document containing object information (image information) that retains the layout of the original paper document. A script program for use in data conversion or layout setting is added to the object information, such that integrated electronic data is generated.

Conversion processing such as enlargement is performed on the electronic data when the data is used by a user. This facilitates conversion processing such as enlargement of desired information without the necessity of a complicated operation to be performed by a user using an image editing application.

Thus, since conversion processing such as enlargement conversion is not performed on data until the data is used, a smaller data processing load is required for image input. In addition, this feature enables a plurality of possible layouts to be displayed for a unit of electronic data.

Moreover, electronic data corresponding to an original document image generated according to an aspect of present invention retains the appearance of the original document image, and using the electronic data, processing such as image conversion can be performed in accordance with a user's simple instruction. This advantageously facilitates correlating electronic data with an original paper document and increases reusability of data.

Further, a user can designate an object to be enlarged in detail when using the data, which advantageously allows display of data to meet the user's requirements.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Exemplary embodiments of the present invention will now be described in detail with reference to the drawings.

First Embodiment

The present embodiment will be provided in connection with descriptions of following: (1) system configuration; (2) electronic data generation processing; and (3) processing performed when electronic data is used.

[(1) System Configuration]

Figure 1:
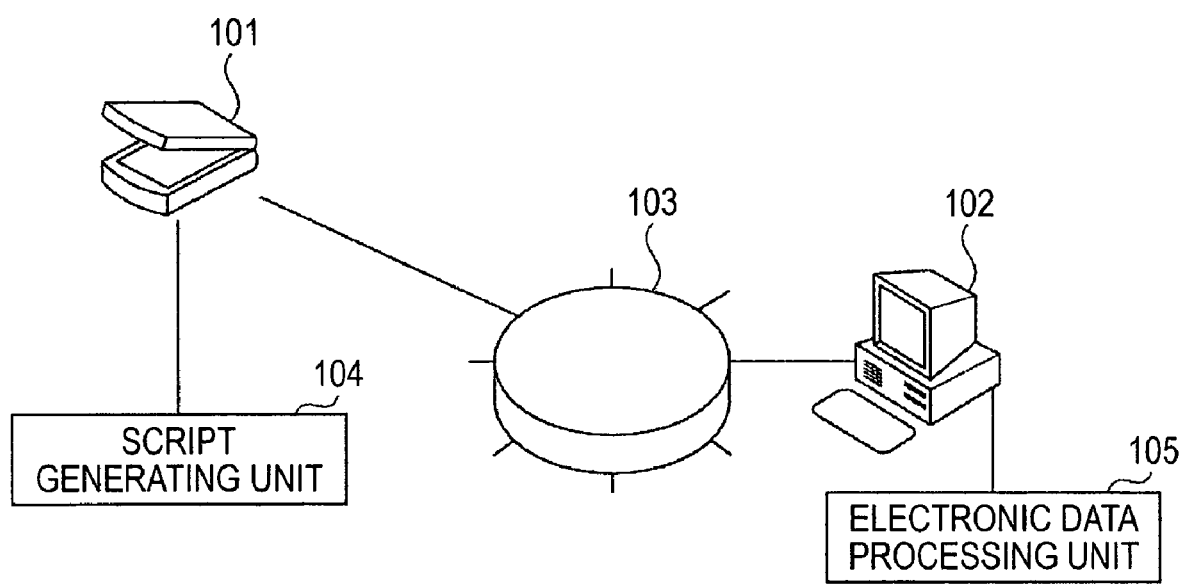
FIG. 1 shows an example of a system configuration according to an embodiment of the present invention.

FIG. 1 shows a system configuration for implementing an embodiment of the present invention.

This system configuration includes an image input device 101, an electronic data control device 102, and a network interface 103, for example, a local area network (LAN) or the Internet.

The image input device 101 is assumed to be an image scanner in this embodiment. However, the image input device 101 may be another image input device such as a multifunction machine and a digital camera. The device 101 may alternatively be a system which includes a plurality of components.

The image input device 101 contains a script generating unit 104 for generating a layout control program (hereinafter referred to as a script program). Processing executed by the script generating unit 104 will be described in detail below. The script generating unit 104 is implemented by special-purpose hardware in this embodiment. However, the script generating unit 104 may be implemented as a software application. In such a case, a central processing unit (CPU) which is built into the image input device 101 executes a computer program including program code. The computer program may be stored in an internal storage medium such as a hard disk and may also be fetched from a removable computer-readable storage medium such as a compact disk—read-only memory (CD-ROM) so as to be executed.

The electronic data control device 102 is assumed to be a general-purpose personal computer (PC) in this embodiment. However, the electronic data control device 102 may be another type of device, for example, a personal digital assistant (PDA), a mobile terminal, or the like. The electronic data control device 102 contains a data processing unit 105. An application program for processing script programs is installed in the electronic data control device 102 so as to implement the data processing unit 105. The electronic data control device 102 acquires this application program from a storage medium or over a network. Although the data processing unit 105 is implemented as a software component in this embodiment, the data processing unit 105 may be implemented using a special-purpose hardware component. The internal configuration of the data processing unit 105 will be described in detail below.

The network interface 103 is used for communication between the image input device 101 and electronic data control device 102 or between remote devices (not shown), so that a program, data, or the like can be read and written.

[(2) Electronic Data Generation Processing]

Figure 2:
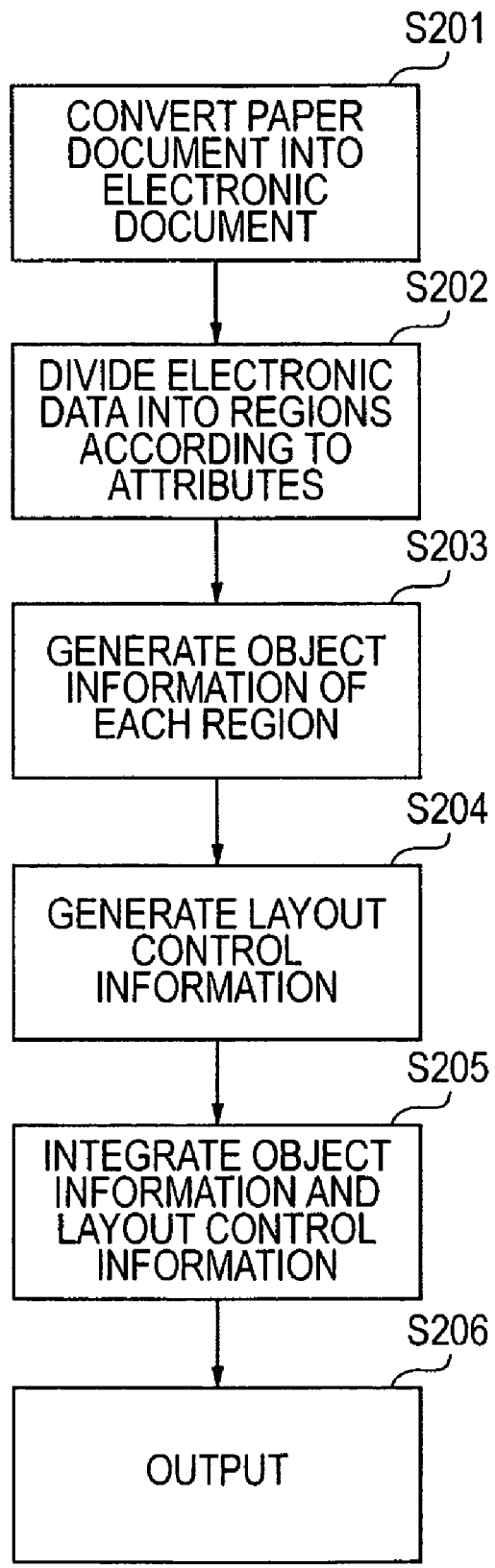
FIG. 2 is a flowchart relating to an electronic data generation procedure.

Referring to the flowchart of FIG. 2, processing will be described in which the image input device 101 and the script generating unit 104 generate electronic data containing a script program (image data including a script program) from a paper document according to the present embodiment.

Figure 3:
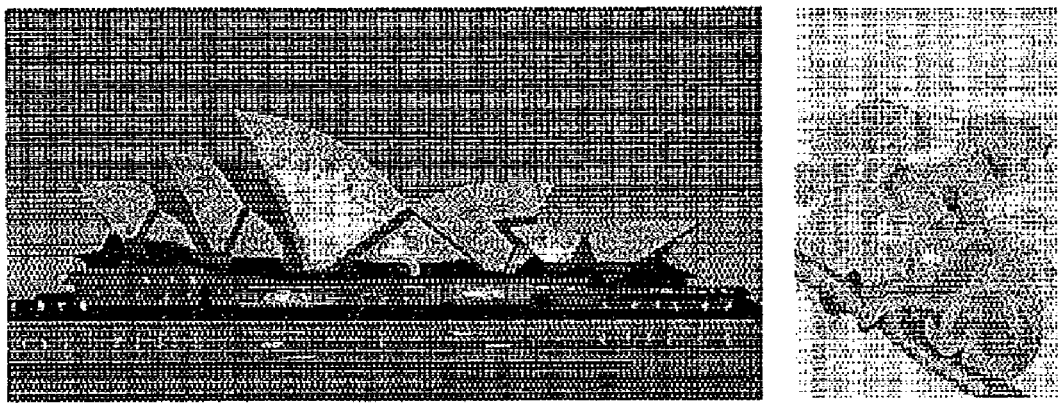
FIG. 3 shows an example of a read document image.

At Step S201, the image input device 101 reads an input paper document and converts the paper document into electronic data (image data), thus obtaining, for example, an image 301 as shown in FIG. 3.

Figure 4:
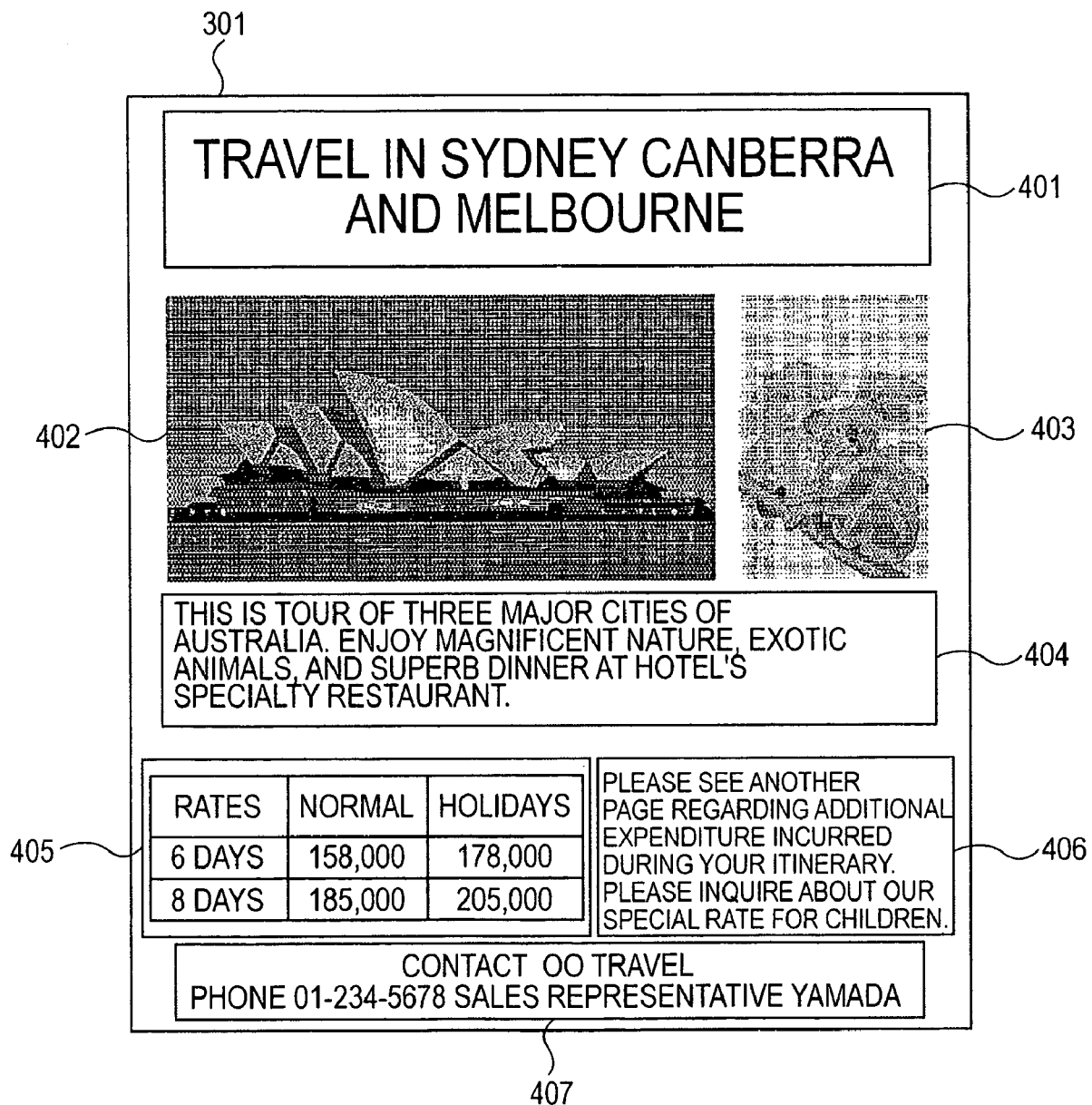
FIG. 4 shows a result of region division processing performed on a document image.

At Step S202, the read image is divided into regions each of which has a classification attribute. The term "attribute" in this embodiment refers to text, photograph, line drawing, or table. For this region division processing, a technique disclosed in U.S. Pat. No. 5,680,478 may be employed, for example. In this technique, a group of black pixels and a group of white pixels are extracted from a document image. Then, the shape, size, and connectivity of each pixel group are analyzed, so that regions are extracted in accordance with attribute-based classification of text, picture or drawing, table, frame, and line. FIG. 4 illustrates a result of such region division processing performed on a document image 301 of FIG. 3 using rectangles each of which encloses one of the divided regions. The attribute of rectangular regions 401, 404, 406, and 407 is text. The attribute of rectangular regions 402 and 403 is photograph, and the attribute of a rectangular region 405 is table. A technique used for this region division processing is not limited to the above example, and another technique may also be employed.

At Step S203, object information is generated from each of the divided regions obtained at Step S202. More specifically, each of the divided regions in a document image is extracted as an object. Object information includes object attribute information, original layout information, visual information, etc.

The layout information in this embodiment includes information concerning a layout such as the width, height, position in an entire page, etc., of each divided object. The layout information also includes information on a sequence order between other objects.

The visual information in this embodiment refers to information concerning display of objects (reproduction of objects). For example, the visual information includes a raster image which is extracted based on the layout information of electronic data originated from a paper document and/or a vector image which is obtained by converting the raster image. The visual information also includes character recognition result information (e.g., text information, font information, etc., which indicate a result of character recognition for a divided region having text attribute). Preferably, appropriate visual information is selected for each attribute. For example, the raster image is selected for a photograph region, the vector image for a line drawing region, the character recognition result information (or vector image in case of low recognition precision) for a text region, and so forth.

At Step S204, layout control information (script program) is generated, which will be described in detail below.

At Step S205, the object information and the layout control information are integrated so that integrated electronic data is produced.

At Step S206, the integrated electronic data is output via the network interface 103 to the electronic data control device 102.

The layout control information of Step S204 will now be described in detail. The layout control information includes a script program (control program) for controlling enlargement/reduction of an object, as well as a script program (control program) for modifying an arrangement of each object.

The layout control information includes the following four script programs: a script A for determining a layout on the basis of a template and the number of objects; a script B for determining a variable magnification ratio (hereinafter simply referred to as a magnification ratio) of an object in accordance with the size of a page layout (arrangement region); a script C for converting an object using a magnification ratio determined by the script B; and a script D for moving the magnified object in accordance with a page layout.

Figure 5A:
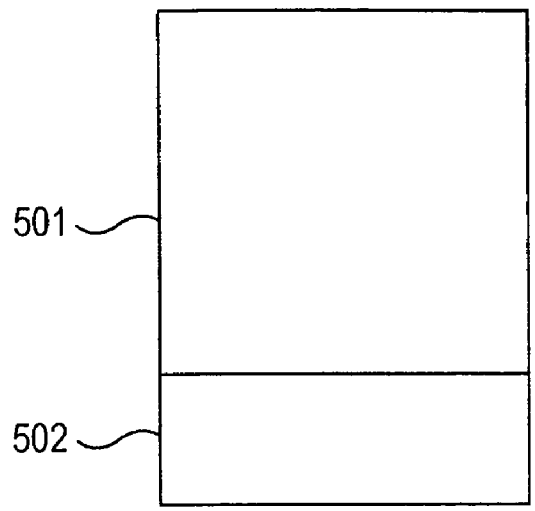
FIGS. 5A through 5D are examples of templates.
Figure 5B:
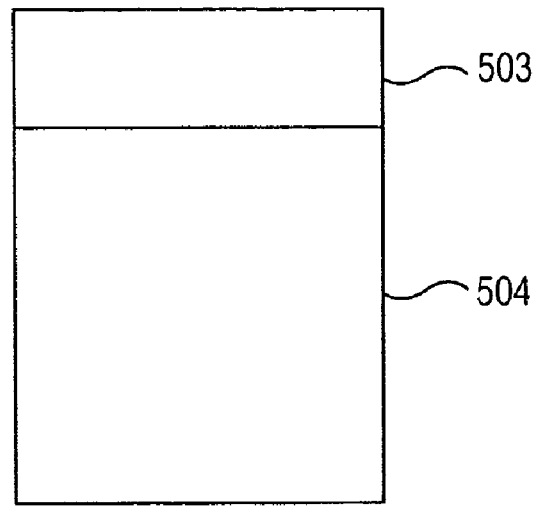
Figure 5C:
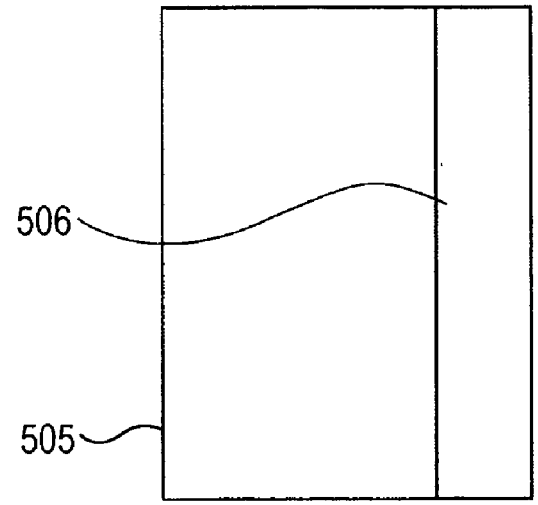
Figure 5D:
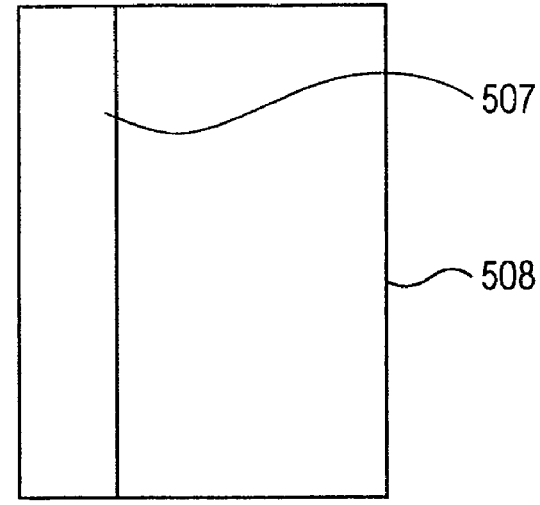
Figure 6:
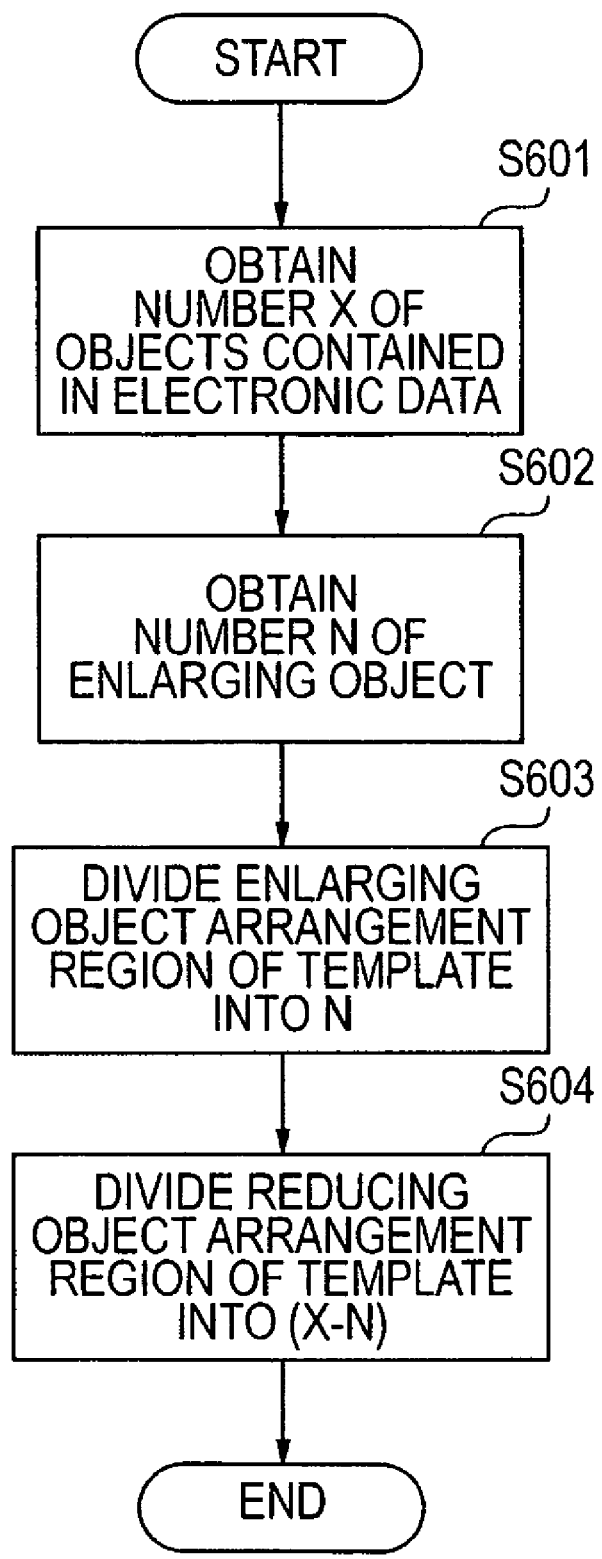
FIG. 6 is a flowchart illustrating an execution procedure of a script A for determining a layout arrangement.

In the following, a description of the script A will be provided with reference to FIG. 5 and FIG. 6. Several templates are prepared, each containing approximate arrangement regions for objects. FIG. 5A shows an exemplary template having an arrangement region which is intended for an object to be enlarged (hereinafter referred to as an enlarging object arrangement region in which the enlarged object is arranged) 501, and an arrangement region intended for an object not to be enlarged or an object to be reduced (hereinafter referred to as a non-enlarging object arrangement region in which the non-enlarged object (or the reduced object) is arranged) 502. Likewise, FIGS. 5B, 5C, and 5D show other exemplary templates having enlarging object arrangement regions 504, 505, and 508, respectively, and non-enlarging object arrangement regions 503, 506, and 507, respectively. In this embodiment, one template is supposed to be selected by a user before a document image is read. Not only may the above templates be employed, but another template may also be created by a user.

Referring to the flowchart of FIG. 6, processing which is performed when the script A is executed by the electronic data control device 102 will now be described.

At Step S601, the number X of objects contained in the electronic data is obtained. In this embodiment, X is the sum of objects obtained through the region division processing according to Step S202 of FIG. 2.

An image of an original layout is displayed. Using the image, one or more objects to be enlarged are selected by a user (hereinafter referred to as enlarging objects), so that the number N of the enlarging objects is obtained, at Step S602.

At Step S603, an enlarging object arrangement region in a preselected template is divided by N.

At Step S604, a non-enlarging object arrangement region of the preselected template is divided by (X-N).

In this embodiment, the procedures for dividing the arrangement regions of Step S603 and S604 are predefined, preferably such that the result of region division processing provides good visualization of objects.

Thus, the image input device 101 transmits electronic data containing a script program (hereinafter referred to as scripted electronic data) to the electronic data control device 102. When the script program included in the electronic data is executed by the electronic data control device 102, a user simply selects one or more objects desired to be enlarged. Then the electronic data control device 102 determines the number of enlarging objects at Step S602 based on this simple operation, and consequently, arrangement regions are determined at Step S603 and S604.

Figure 7:
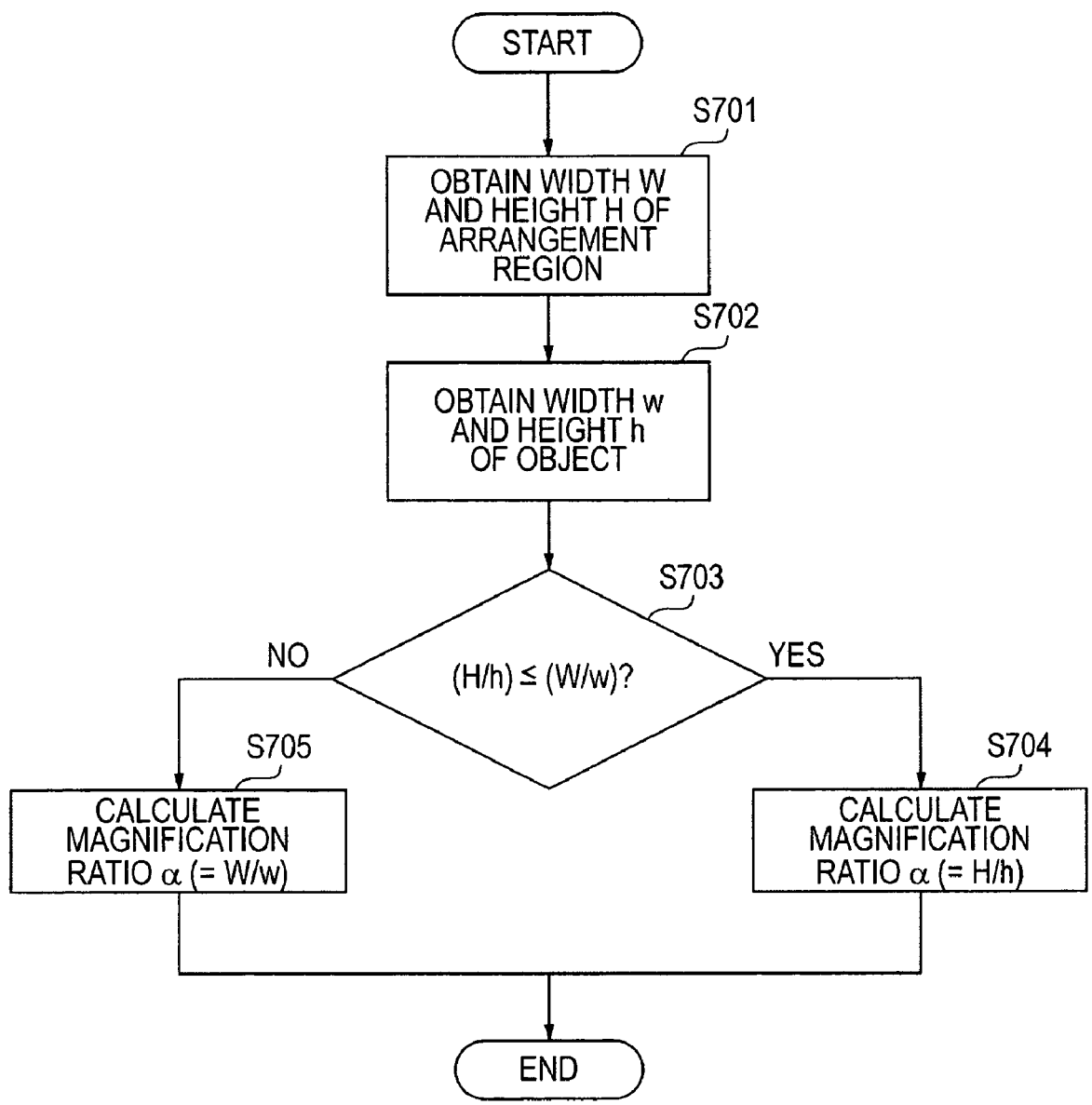
FIG. 7 is a flowchart illustrating an execution procedure of a script B where an aspect ratio is maintained.
Figure 8:
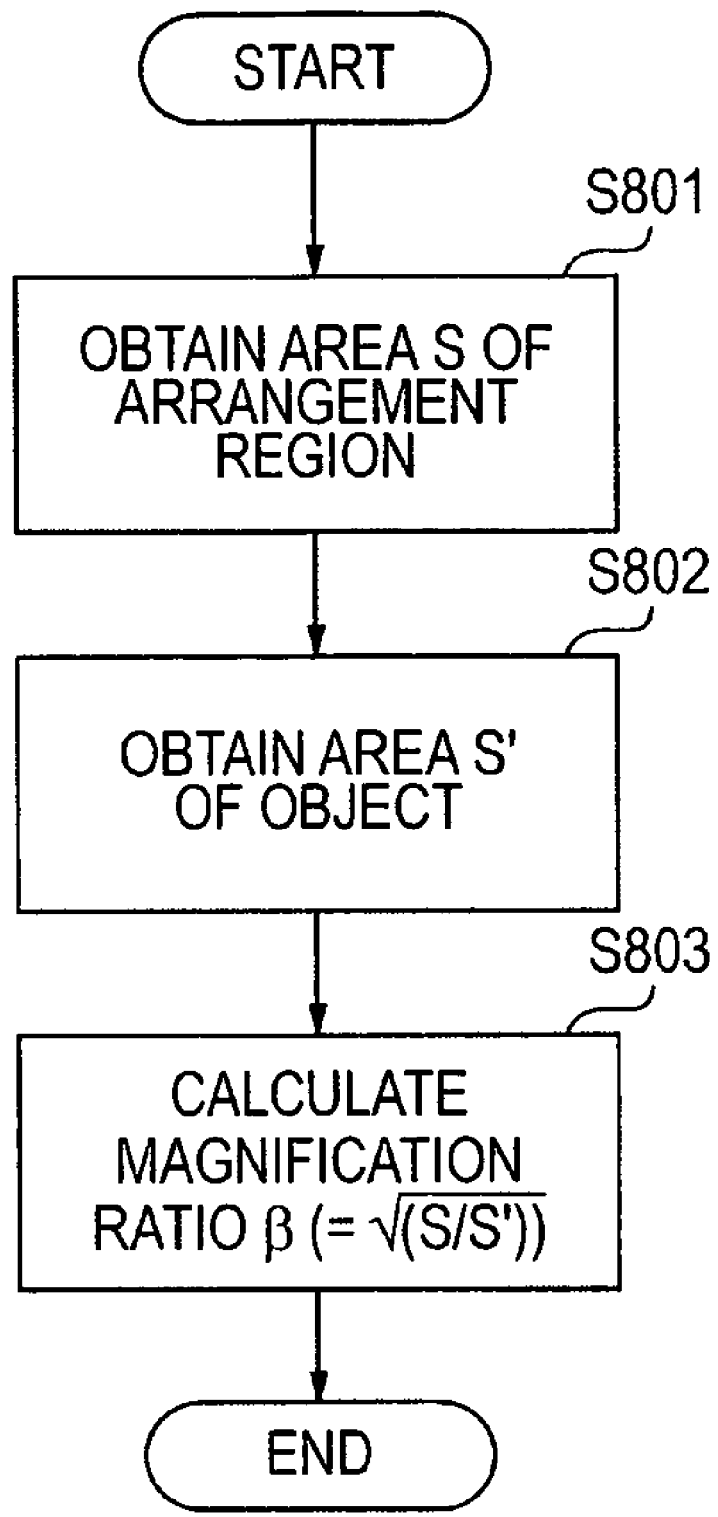
FIG. 8 is a flowchart illustrating an execution procedure of a script B where an aspect ratio is not maintained.

Referring to FIG. 7 and FIG. 8, processing will be described which is performed when the script B is executed by the electronic data control device 102. The script B performs processing for obtaining a magnification ratio for each object, so that each object is laid within the corresponding object arrangement region which has been generated (divided) in the processing of FIG. 6.

A manner of obtaining a magnification ratio depends on the attribute of an object. More specifically, when the attribute of an object is photograph, line drawing, or table, the object is magnified with its aspect ratio maintained. When the attribute of an object is text, the size of each character in the text object is magnified, and each of the magnified characters is rearranged in an arrangement region.

Referring to FIG. 7, processing will be described for obtaining a magnification ratio when the aspect ratio of an object is maintained.

At Step S701, a width W and a height H of an arrangement region are obtained. Meanwhile, an arrangement region in this embodiment refers to an enlarging object arrangement region as described with reference to FIG. 6 when a magnification ratio of an enlarging object is calculated, or a non-enlarging object arrangement region when a magnification ratio of an object not to be enlarged or an object to be reduced (hereinafter referred to as a non-enlarging object) is calculated.

At Step S702, a width w and a height h of an object are obtained. The values of w and h are dependent on an object whose magnification ratio is calculated.

At Step S703, if $(H/h) \leq (W/w)$, the processing proceeds to Step S704. If $(H/h) \leq (W/w)$ is not satisfied, the processing proceeds to Step S705.

At Step S704, a magnification ratio $\alpha$ is calculated as $\alpha = H/h$.

At Step S705, a magnification ratio $\alpha$ is calculated as $\alpha = W/w$.

Each of the foregoing processing steps of FIG. 7 is performed on each object whose attribute is photograph, line drawing, or table, so that a magnification ratio for each object is calculated.

Referring now to FIG. 8, a manner of calculating a magnification ratio when an aspect ratio is not to be taken into account (when an object is a text region) will be described.

At Step S801, an area S of an arrangement region is calculated on the basis of a width and a height of the arrangement region. Meanwhile, an arrangement region in this embodiment refers to an enlarging object arrangement region as described with reference to FIG. 6 when a magnification ratio of an enlarging object is calculated or a non-enlarging object arrangement region when a magnification ratio of a non-enlarging object is calculated.

At Step S802, an object area S1 is obtained from the width and height of a text region.

At Step S803, a magnification ratio $\beta$ is calculated as $\beta = \sqrt{S/S1}$.

Each of the foregoing steps of FIG. 8 is performed on each text region so that a magnification ratio for each character included in the text region is calculated.

Figure 9:
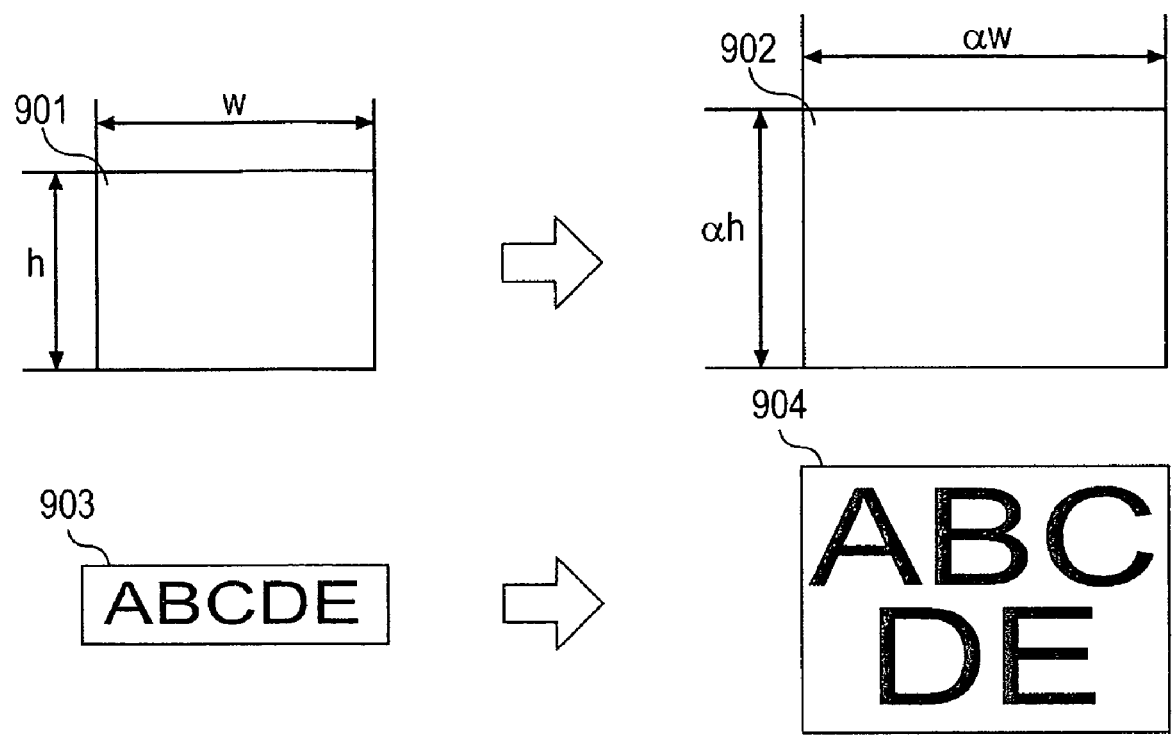
FIG. 9 illustrates variable magnification processing performed on an object in accordance with a script C.

Referring to FIG. 9, processing will be described which is performed when the script C is executed by the electronic data control device 102.

When the script C is executed, conversion processing is performed on each object on the basis of the magnification ratio calculated in the processing of the script B.

Conversion processing varies with object attributes. More particularly, when the object attribute is photograph, line drawing, or table, a linear magnification is performed on the basis of the magnification ratio calculated in the processing of FIG. 7. In this linear magnification, the aspect ratio of an object is maintained. When the object attribute is text, each character included in the text region is magnified on the basis of the magnification ratio calculated in the processing of FIG. 8. Then, each magnified character is arranged in accordance with the shape of an arrangement region.

FIG. 9 shows an object 901 on which a linear magnification is intended to be performed and an object 902 which is the result of the linear magnification. FIG. 9 also shows a text object 903 on which the character magnification described above is intended to be performed and a text object 904 in which each of the magnified characters is rearranged in accordance with the shape of an arrangement area.

When the script D is executed, processing is performed for converting coordinate information (position information) of each object which has been magnified on the basis of the script C. This conversion processing is performed in accordance with the position of each arrangement region (layout) which has been determined by the script A.

The scripts A through D for performing the foregoing processing are generated by the script generating unit 104 and added to image data.

[(3) Processing when Data is Used]

Figure 10:
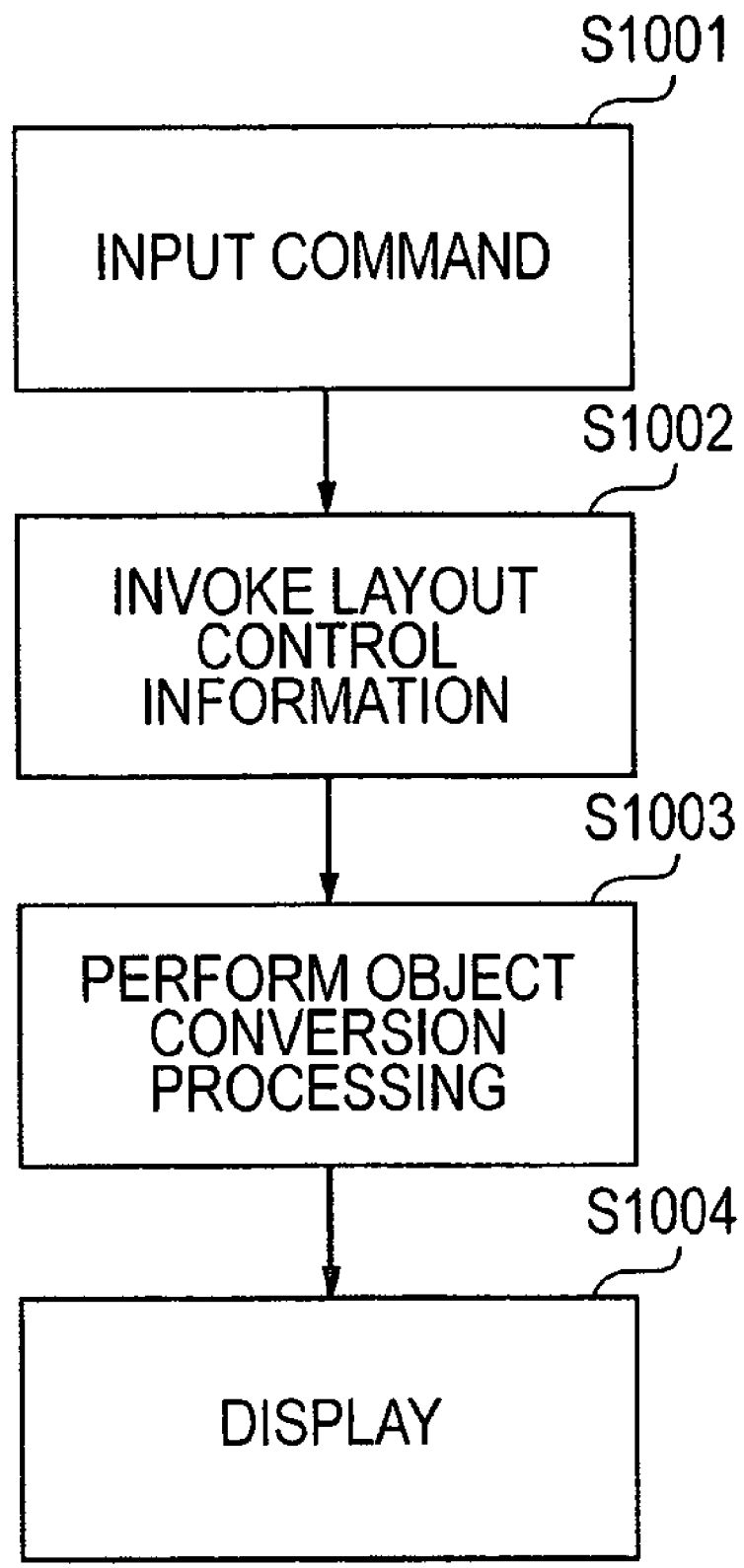
FIG. 10 is a flowchart illustrating a procedure where scripted electronic data is used.

Referring to the flowchart of FIG. 10, processing which is performed when the electronic data processing unit 105 in the electronic data control device 102 uses the scripted electronic data (the electronic data including a script program) generated by the script generating unit 104 will be described.

At Step S1001, an original image is reproduced in accordance with original layout information contained in electronic data, and a user inputs a command for designating an enlarging object. In this command input, an enlarging region in the displayed electronic data is designated using an input device such as a keyboard or a pointing device of a general-purpose personal computer. For example, an intended region may be enclosed or pointed out using a pointed device so that an enlarging object is selected.

Upon completion of enlarging object designation, which is detected upon a depression of an operation execution key or a double click of a pointing device, etc., a processing sequence for object enlargement is initiated.

In this embodiment, a case is described where a user selects, as enlarging objects, a table object 405 and a text object 406, out of the objects shown in the document image of FIG. 4.

At Step S1002, the script programs (the layout control information generated at Step S204 of FIG. 2) contained in the electronic data are invoked.

At Step S1003, object conversion processing is performed by executing each script program.

First, the script A is executed for determining a layout on the basis of a template and the number of objects as described with reference to FIG. 6.

In this embodiment, the template of FIG. 5A is supposed to be preselected. In this case, the number X of the objects contained in the electronic data of FIG. 4 is seven (X=7), and the number N of the selected enlarging objects is two (N=2). Therefore, a layout of arrangement regions is generated as shown in FIG. 13, which includes enlarging object arrangement regions 501_1 and 501_2 and non-enlarging object arrangement regions 502_1, 502_2, 502_3, 502_4, and 502_5.

Then, the script B is executed for determining a magnification ratio of each object, as described with reference to FIG. 7 and FIG. 8.

Figure 13:
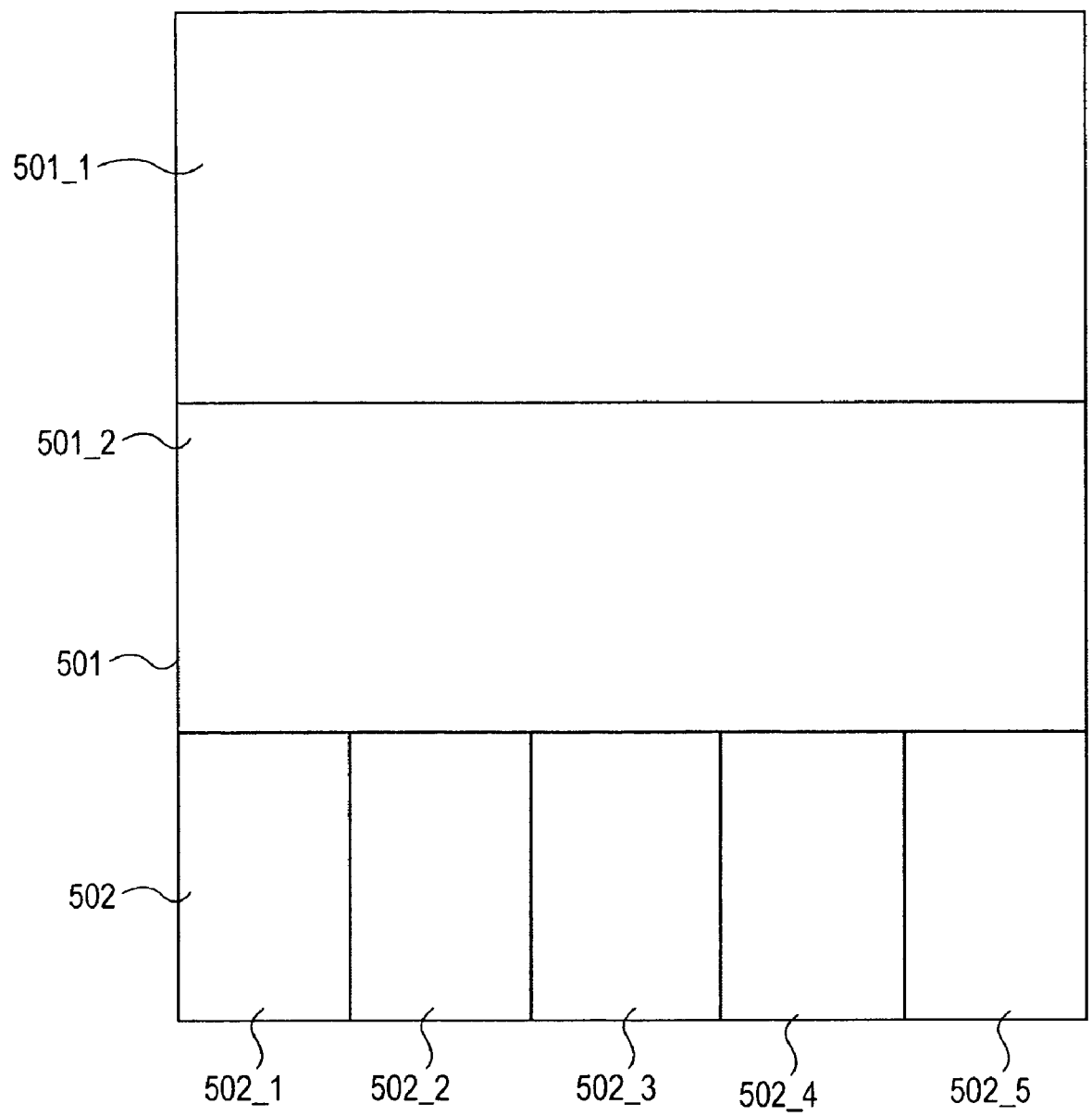
FIG. 13 shows an example of a layout of arrangement regions where X=7 and N=2.

In this embodiment, a magnification ratio for each of the objects 405 and 406 of FIG. 4 is calculated in accordance with each of the enlarging object arrangement regions of FIG. 13, and a magnification ratio for each of the objects 401, 402, 403, 404, and 407 is calculated in accordance with each of the non-enlarging object arrangement regions of FIG. 13. Since the objects 402 and 403 are photograph objects and the object 405 is a table object, a magnification ratio to be calculated maintains the aspect ratio of each of these objects. For each of the text objects 401, 404, 406, and 407, a magnification ratio is calculated as described above with reference to FIG. 8.

Subsequently, the script C is executed on the basis of the calculated magnification ratios.

As described above, a linear magnification is performed on each of the objects 402, 403, and 405 of FIG. 4 with the aspect ratio maintained. For each of the text objects 401, 404, 406, and 407 of FIG. 4, the size of each character is magnified, and each of the magnified characters is rearranged in accordance with the shape of an arrangement region.

The script D is now executed. A conversion of coordinate information (position information) is performed on each of the magnified objects in accordance with the position of each arrangement region (layout).

Figure 11:
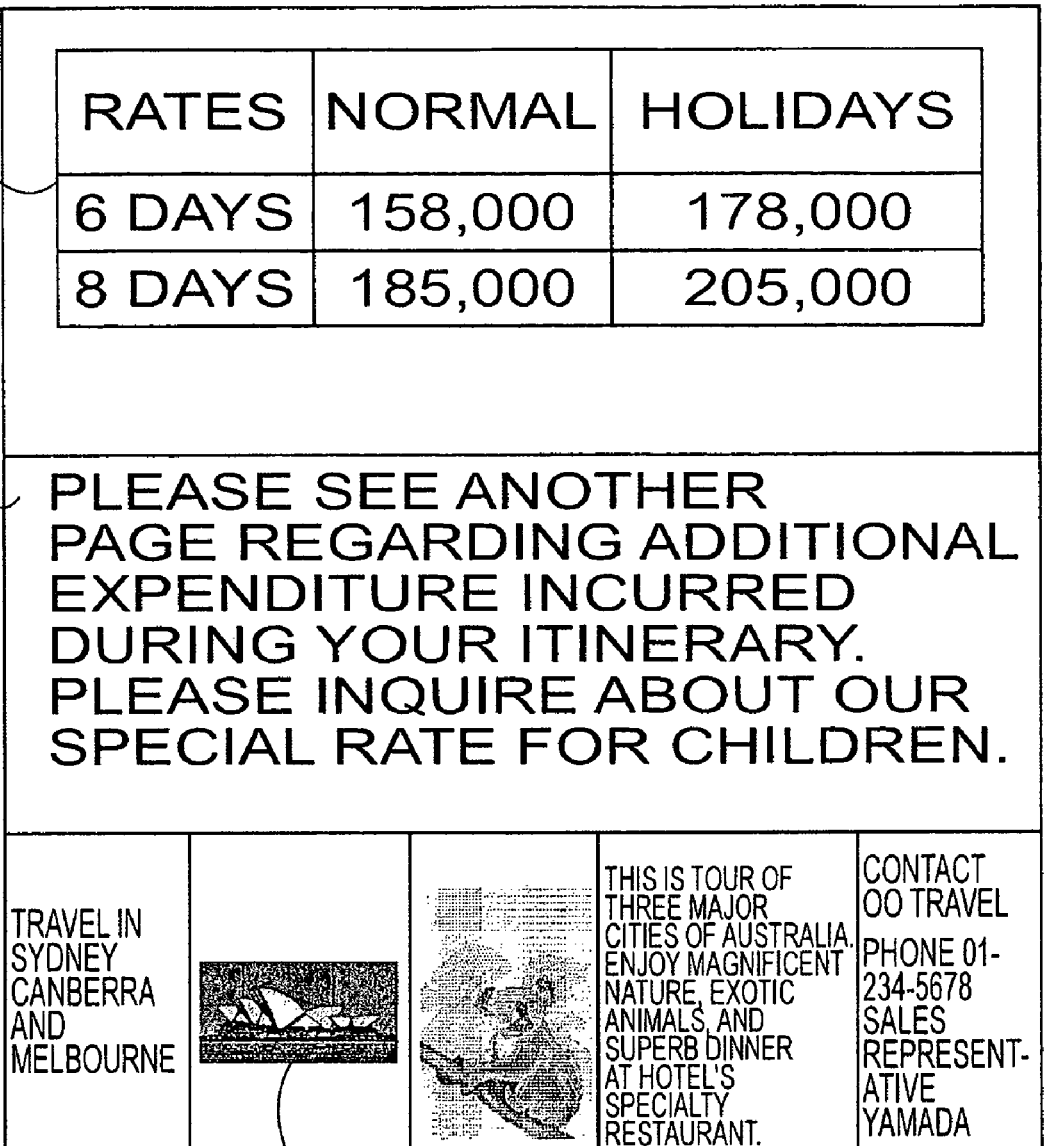
FIG. 11 shows an example of an image obtained as a result of magnification and arrangement processing.

At Step S1004, the converted objects are displayed on the electronic data control device 102, as shown in FIG. 11.

Thus, a layout can readily be modified by a simple operation of selecting one or more objects to be enlarged using an image of original layout.

Accordingly, a user is allowed to enlarge an object in accordance with the user's interest or need. For example, in such a brochure as shown in FIG. 4, a user might desire to enlarge a portion which contains small characters.

Second Embodiment

In the first embodiment, script programs are executed so that magnification processing is performed on every object. However, when the size (width and height) of an original object other than an enlarging object does not exceed the size of an arrangement region, magnification processing may not be performed, and only a conversion of coordinate information may be performed. This reduces the number of processing tasks, thus bringing about a higher processing speed in data use compared with the processing according to the first embodiment.

Third Embodiment

A script program to be added to electronic data is not limited to those described in the first embodiment and another script program, for example, for performing the following processing may be added.

In the first embodiment, an object arrangement is modified such that any object can be viewed on the screen even after one or more objects have been enlarged. However, processing for magnifying and moving only an enlarging object may be performed.

Figure 12:
FIG. 12 shows an example illustrating magnification performed on a designated object.

For example, when the object 407 of FIG. 4 is selected as an enlarging object, only the object 407 is enlarged as shown in FIG. 12. In this embodiment, other objects 401 through 406 are neither magnified nor moved, and a script program is executed for enlarging only the object 407. The magnification ratio may be determined so that the width and height of the magnified object will not exceed the longitudinal length and lateral length of the original image, respectively, as shown in FIG. 12.

Thus, conversion processing is performed only on an enlarging object. This leads to a higher processing speed in data use compared with the first embodiment.

Fourth Embodiment

In the first embodiment, a case is described where an application is installed in the electronic data control device 102 so that a script program contained in electronic data can be executed. However, the present embodiments are not limited to this case. For example, scripted electronic data may be described in advance in the electronic data control device 102 using a format that the device can interpret, such that the present invention can be implemented without application installation.

For example, a script program and object information may be stored in the device using a general-purpose format such as a PDF, so that the device interprets and executes the script program.

In addition, a case is described in the first embodiment where scripted electronic data is generated by the image input device 101, and the electronic data is transmitted to the electronic data control device 102 so as to be executed. However, the present embodiments are not limited to this case. For example, the image input device 101 may generate electronic data and also execute a script program. In this case, a user instruction is received through the screen display of the image input device 101.

Fifth Embodiment

In the first embodiment, electronic data is generated by integrating object information and layout control information (script program). However, an original document image may be integrated together with object information and layout control information. In this case, when the scripted electronic data is used, the integrated original document image may be used for displaying an original document image, for example, in the processing of Step S1001.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Application No. 2005-191539 filed Jun. 30, 2005, which is hereby incorporated by reference herein in its entirety.

What is claimed is:

1. A data processing apparatus included in a data processing system, the data processing system including the data processing apparatus and an external device, the data processing apparatus comprising:
    object extracting means for extracting objects from an input image;
    integrating means for generating integrated electronic data by integrating object information of the extracted objects with layout control information, the layout control information including a script program for modifying a layout of the objects, the object information including original layout information of the objects; and
    outputting means for transmitting the integrated electronic data to the external device,
    wherein the external device is configured to execute the script program and perform:
        a displaying step of displaying an image of the original layout in accordance with the original layout information included in the object information, and instructing a user of the external device to select one or more objects to be enlarged;
        a determining step of determining magnification ratios of each object included in the integrated electronic data based on the one or more objects selected in the displaying step; and
        a modifying step of modifying the layout of the objects which are converted based on the determined magnification ratios of each object.

2. The data processing apparatus of claim 1, wherein the object extracting means divides the input image into regions each of which has an attribute, and extracts each of the divided regions as the object.

3. The data processing apparatus of claim 1, wherein the object information includes object attribute information, the original layout information, and visual information.

4. The data processing apparatus of claim 3, wherein the visual information is information for enabling reproducing and displaying of each object using one of raster image, vector image, and character recognition result information for each object.

5. The data processing apparatus of claim 1, wherein the modifying step performs enlargement, reduction, and arrangement processing for the object so as to modify a layout of the object.

6. The data processing apparatus of claim 5, wherein the modifying step enlarges an object designated by the user of the external device.

7. The data processing apparatus of claim 1, wherein the layout of the objects, which are converted based on the determined magnification ratios of the objects, are modified in the modifying step based on a template layout.

8. The data processing apparatus of claim 7, wherein the template layout includes an arrangement region intended for an object to be enlarged and an arrangement region intended for an object not to be enlarged, and wherein the modifying step divides each arrangement region based on a number of the enlarging objects and arranges the object on each divided arrangement region.

9. The data processing apparatus of claim 1, wherein the modifying step enlarges only an object designated by a user, in accordance with a longitudinal length or a lateral length of the image.

10. The data processing apparatus of claim 1, wherein the script program contained in the layout control information is executed by the external device when the integrated electronic data is used.

11. The data processing apparatus of claim 1, wherein the integrating means generates the integrated electronic data by integrating the object information, the layout control information, and the input image, and wherein the input image contained in the integrated electronic data is used when the image of the original layout of the object is displayed in the displaying step.

12. The data processing apparatus of claim 1, further comprising reading means for reading a document so as to generate a read image, wherein the input image is a read image read by the reading means.

13. A data processing method for controlling a data processing apparatus included in a data processing system, the data processing system including the data processing apparatus and an external device, the data processing method comprising:

extracting objects from an input image;

generating integrated electronic data by integrating object information of the extracted objects with layout control information, the layout control information including a script program for modifying a layout of the objects, the object information including original layout information of the objects;

transmitting the integrated electronic data to the external device; and executing the script program in the external device and effecting steps comprising:

a displaying step of displaying an image of the original layout in accordance with the original layout information included in the object information, and instructing a user of the external device to select one or more objects to be enlarged;

a determining step of determining magnification ratios of each object included in the integrated electronic data based on the one or more objects selected in the displaying step; and a modifying step of modifying the layout of the objects which are converted based on the determined magnification ratios of each object.

14. A computer-readable storage medium having stored thereon a computer program comprising program code having computer-executable instructions for causing a data processing apparatus and an external device to execute a method comprising:

extracting objects from an input image;

generating integrated electronic data by integrating object information of the extracted objects with layout control information, the layout control information including a script program for modifying a layout of the objects, the object information including original layout information of the objects;

transmitting the integrated electronic data to the external device; and executing the script program in the external device and effecting steps comprising:

a displaying step of displaying an image of the original layout in accordance with the original layout information included in the object information, and instructing a user of the external device to select one or more objects to be enlarged;

a determining step of determining magnification ratios of each object included in the integrated electronic data based on the one or more objects selected in the displaying step; and a modifying step of modifying the layout of the objects which are converted based on the determined magnification ratios of each object.

\* \* \* \* \*